United States Patent
MacLennan et al.

(10) Patent No.: US 8,061,396 B2
(45) Date of Patent: Nov. 22, 2011

(54) TOOTH FOR A CIRCULAR SAW OR MOWER DRUM

(76) Inventors: Charles MacLennan, Rigaud (CA); Denis Rioux, Rimouski (CA)

(*) Notice: Subject to any disclaimer, the term of this patent is extended or adjusted under 35 U.S.C. 154(b) by 140 days.

(21) Appl. No.: 12/355,035

(22) Filed: Jan. 16, 2009

(65) Prior Publication Data

US 2010/0180735 A1   Jul. 22, 2010

(51) Int. Cl.
*B27C 1/00* (2006.01)
*B27G 13/00* (2006.01)

(52) U.S. Cl. .......... 144/363; 144/218; 144/241; 83/836; 83/837; 407/44; 407/62; 407/77; 407/113

(58) Field of Classification Search ............... 144/218, 144/230, 235, 241, 363; 83/835–838; 407/33, 407/34, 40, 42, 44, 46, 47, 53, 60–62, 66, 407/77, 101, 102, 113
See application file for complete search history.

(56) References Cited

U.S. PATENT DOCUMENTS

| | | | | |
|---|---|---|---|---|
| 3,945,289 A | * | 3/1976 | Baez Rios | 83/853 |
| 4,932,447 A | | 6/1990 | Morin | |
| 5,211,212 A | * | 5/1993 | Carlson et al. | 144/241 |

FOREIGN PATENT DOCUMENTS

| | | |
|---|---|---|
| CA | 2011788 | 7/1991 |
| CA | 2084013 | 4/1994 |
| CA | 2120595 | 10/1995 |
| CA | 2422463 | 10/2003 |
| CA | 2568404 | 5/2007 |
| CA | 2588927 | 8/2008 |

OTHER PUBLICATIONS

U.S. Appl. No. 29/330,946, filed Jan. 16, 2009, MacLennan.

* cited by examiner

*Primary Examiner* — Shelley Self
(74) *Attorney, Agent, or Firm* — Marshall, Gerstein & Borun LLP; Richard M. LaBarge

(57) ABSTRACT

A tooth for a circular saw or a mower drum that can be used to cut standing trees or brush and undergrowth. The tooth has four cutting edges arranged in a first pair of opposed cutting edges that are generally straight and a second pair of opposed cutting edges that are generally concave. The tooth is mounted in a holder in a first or second cutting position that orients a cutting edge of the first or second pair to physically contact and effect a cutting method to a cuttable material. In a first cutting method, a generally straight cutting edge contacts the material, resulting in a slicing action. In a second cutting method, a generally concave cutting edge contacts the material, resulting in a gouging action. Teeth in the circular saw or brush mower alternate between first and second cutting positions, allowing both cutting methods to be applied to cuttable material.

11 Claims, 10 Drawing Sheets

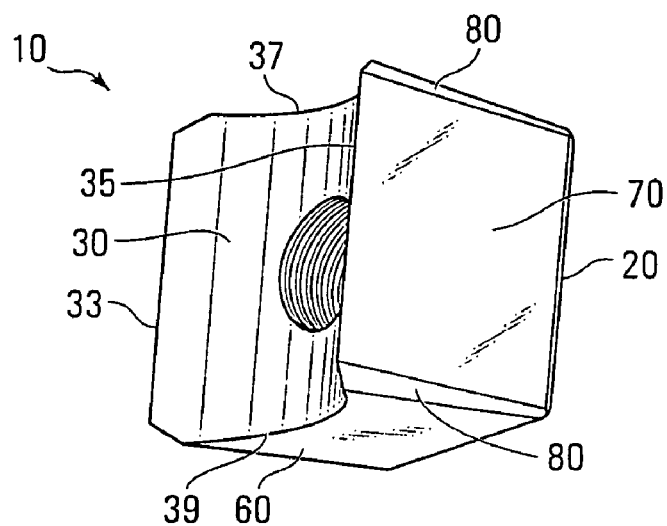
FIG. 1
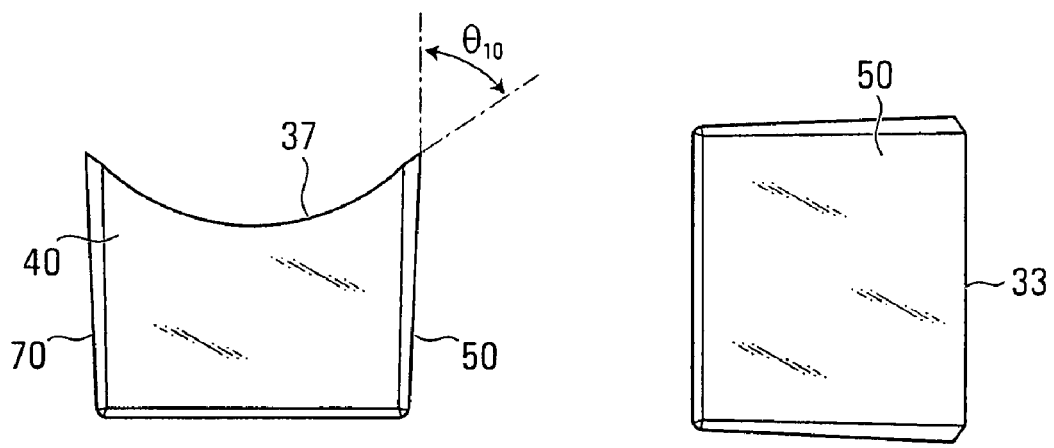
FIG. 2
FIG. 3
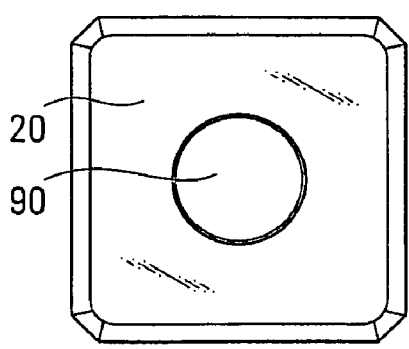
FIG. 4
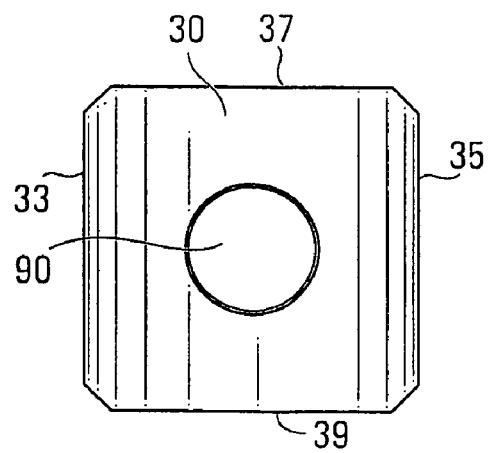
FIG. 5

TOOTH FOR A CIRCULAR SAW OR MOWER DRUM

FIELD OF THE INVENTION

The present invention relates to a tooth for a circular saw or a mower drum.

BACKGROUND OF THE INVENTION

A tooth that may be used for a circular saw or brush mower with a plurality of cutting edges usually has a four-sided main body with a cutting end and a mounting end. The four cutting edges found at the cutting end of such a tooth are typically identical to each other, such as being generally straight or concave. Because these cutting edges are identical, a material that makes contact with any cutting edge of such a tooth is cut in exactly the same manner.

When such a tooth is used in a circular saw, brush mower or any other device, a plurality of teeth is mounted on one side of its body via a plurality of holders that are in turn mounted to the edge of the saw disk or mower drum. While in this configuration, all of the cutting edges of each tooth rotate in the same general direction as the saw or brush mower, but only the outermost cutting edge of such a tooth is able to engage with and apply the cutting manner to the material with which it makes contact.

Over time, the outermost cutting edge of the tooth becomes dull and its ability to efficiently effect the cutting manner on a material decreases with use. Because the tooth has two pairs of identical cutting edges, however, the tooth only needs to be rotated 90° or 180° to restore its ability to efficiently effect the cutting manner on a material to be cut.

However, use of such a tooth also presents certain problems. Among these problems, the cutting manner that is effected by the four identical cutting edges may not be appropriate for all materials in an area. (For example, the varying density of hardwood and softwood trees within an area may require that different cutting manners being used.) As a result, the saw or brush mower equipped with a tooth that is only able to effect a single cutting manner that less than ideal for the material to be cut may require additional cutting time or result in an wastage of materials larger than would have been otherwise had the ideal cutting manner for the material been used.

Against this background, there is a need in the industry for a tooth that can be mounted on a circular saw, brush mower or any other cutting device that provides a multiplicity of ways to cut a material.

SUMMARY OF THE INVENTION

As embodied and broadly described herein, the present invention provides a tooth for a circular saw or a mower drum that is rotatable relative to an axis of rotation, said tooth being mountable on a holder, which is mountable on the saw or the mower drum, said tooth having four corners and four divergent sides extending from a mounting end to a cutting end, said cutting end having a first pair of opposed cutting edges and a second pair of opposed cutting edges, said first pair of opposed cutting edges being generally straight and said second pair of opposed cutting edges being generally concave, said tooth being mountable on the holder in two different positions, a first position, wherein said opposed straight cutting edges are generally parallel and said opposed concave edges are generally perpendicular relative to the axis of rotation of the saw or mower drum, and a second position, wherein said opposed straight cutting edges are generally perpendicular and said opposed concave edges are generally parallel relative to the axis of rotation of the saw or mower drum.

The present invention also provides a method of cutting a tree, comprising: (a) providing a circular saw having a periphery and being rotatable relative to an axis of rotation; (b) providing a plurality of holders mounted on the periphery of the saw; (c) providing a plurality of teeth wherein each tooth has four corners and four divergent sides extending from a mounting end to a cutting end, the cutting end having a first pair of opposed cutting edges and a second pair of opposed cutting edges, the first pair of opposed cutting edges being generally straight and the second pair of opposed cutting edges being generally concave; (d) mounting at least one of the teeth on a first holder in a first position such that the opposed straight cutting edges are generally parallel and the opposed concave edges are generally perpendicular relative to the axis of rotation of the saw; and (e) mounting at least another one of the teeth in a second position on a second holder such that the opposed straight cutting edges are generally perpendicular and the opposed concave edges are generally parallel relative to the axis of rotation of the saw.

BRIEF DESCRIPTION OF THE DRAWINGS

A detailed description of the embodiments of the present invention is provided herein below, by way of example only, with reference to the accompanying drawings, in which:

FIG. 1 is a perspective view of a tooth constructed in accordance with a first embodiment of the invention;

FIG. 2 is a top view of the tooth shown in FIG. 1, the bottom view thereof being identical;

FIG. 3 is a side elevational view of the tooth show in FIG. 1, the right side view thereof being identical;

FIG. 4 is a rear view of the tooth shown in FIG. 1;

FIG. 5 is a front view of the tooth shown in FIG. 1;

Figure 6:
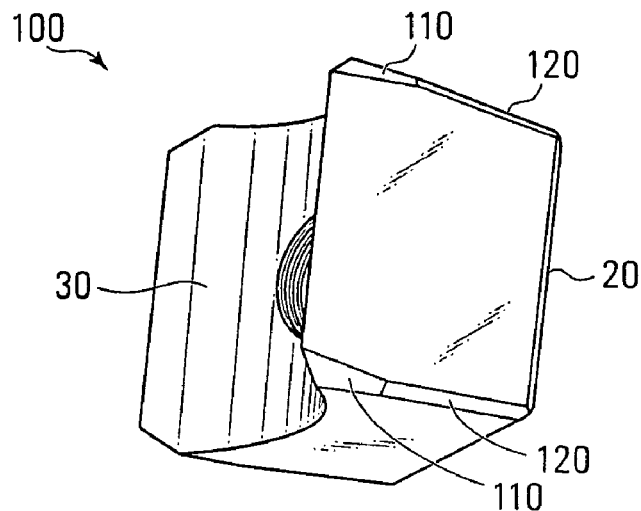
FIG. 6 is a perspective view of a tooth constructed in accordance with a second embodiment of the invention.

In the drawings, embodiments of the invention are illustrated by way of examples. It is to be expressly understood that the description and drawings are only for the purpose of illustration and are an aid for understanding. They are not intended to be a definition of the limits of the invention.

DETAILED DESCRIPTION OF THE EMBODIMENTS OF THE INVENTION

To facilitate the description, any reference numeral designating an element in one figure will designate the same element if used in any other figures. In describing the embodiments, specific terminology is resorted to for the sake of clarity but the invention is not intended to be limited to the specific terms so selected, and it is understood that each specific term comprises all equivalents.

Unless otherwise indicated, the drawings are intended to be read together with the specification, and are to be considered a portion of the entire written description of this invention. As used in the following description, the terms "horizontal", "vertical", "left", "right", "up", "down" and the like, as well as adjectival and adverbial derivatives thereof (e.g., "horizontally", "rightwardly", "upwardly", "radially", etc.), simply refer to the orientation of the illustrated structure as the particular drawing figure faces the reader. Similarly, the terms "inwardly," "outwardly" and "radially" generally refer to the orientation of a surface relative to its axis of elongation, or axis of rotation, as appropriate.

FIGS. 1 to 5 show a tooth 10 constructed in accordance with a first embodiment of the invention. In one application, the tooth 10 can be used with certain equipment, such as a circular saw, to cut and fell trees. In another application, the tooth 10 can be used with certain other equipment, such as a brush mower, to clear and mulch brush and other debris from a path or area.

The tooth 10 illustrated in these figures is a 2¼" tooth, but similar teeth of other sizes may be possible. As a result, dimensions provided in the following description may be seen as applying to the tooth 10 and construed as illustrative for similar teeth that may be larger or smaller than the tooth 10.

The tooth 10 has a mounting end 20, a cutting end 30, four divergent sides 40, 50, 60, 70, a set of beveled edges 80, and a central mounting hole 90 extending therethrough for receiving a component of a fastening system, such as the bolt.

The body of the tooth 10 is in a frustro-pyramidal shape with the four divergent sides 40, 50, 60 and 70 extending from the mounting end 20 to the cutting end 30. The body of the tooth 10 can be made of any suitable alloy steel, such as a fine-grain alloy steel. Surfaces at the cutting end 30 in certain variants may be comprised of, or alloyed with, different materials to extend the operational life and/or resist fracture from an impact.

The tooth 10 is generally frustro-pyramidal due to the length of each divergent side at the cutting end 30 being longer than its corresponding length at the mounting end 20. Specifically, the length of each divergent side 40, 50, 60 and 70 at the cutting end 30 lies between 2.25" and 2.35", and more preferably between 2.29" and 2.32". In contrast, the length of each divergent side 40, 50, 60 and 70 at the mounting end 30 lies between 1.9" and 2.1", and more preferably between 1.87" and 2.01". The difference between the lengths of the divergent sides 40, 50, 60 and 70 at the cutting end 30 and the mounting end 20 results in a slope that varies between 3° and 8° between the ends 20 and 30, giving the tooth 10 its frustro-pyramidal shape.

FIG. 5 is a top view of the tooth 10, showing the cutting end 30, which is defined by four edges of equal lengths between 2.25" and 2.35", and more preferably between 2.29" and 2.32". Although the cutting end 30 has four edges that are of equal length, it is not a perfect square since the corner between each of its edges is beveled at an angle, resulting in a rounded square shape. The angle of the beveled surface at each corner may be between 30° and 60°, and more preferably around 45°. This figure also shows how these four edges define two pairs of opposed cutting edges for the tooth 10, namely: (i) a first pair of opposed cutting edges 33, 35 and (ii) a second pair of opposed cutting edges 37, 39. Although the length of each cutting edge is the same, the general shape, composition and purpose of each pair of opposed cutting edges can be different, as is explained below.

As shown in FIGS. 1 to 3, the shape of the first pair of opposed cutting edges 33, 35 between its two adjacent corners is straight, resulting in a cutting edge that is perpendicular at all points, and the shape of the second pair of opposed cutting edges 37, 39 is generally concave between its two adjacent corners, resulting in a cutting edge that is only perpendicular at the edge corners, as well as at the lowest point on the meniscus defined between these corners. The generally concave shape of the second pair of opposed cutting edges 37, 39 is formed by machining the body of the tooth such that the opposed concave edges and the cutting end follow a radius of curvature. It is understood that teeth with concave cutting edges that have different cutting angles can be realized by selecting different radii of curvature when machining the tooth.

As shown in FIG. 2, angle $\theta_{10}$ represents the angle between an imaginary line extending from one of the first pair of opposed cutting edges 37, 39 and an imaginary line extending from one of the opposed sides 50, 70. The angle $\theta_{10}$ represents the range of cutting angles of the concave cutting edge (edge 37, as shown in FIG. 2) and the value of the angle $\theta_{10}$ can vary between 25° and 50°, and more preferably between 35° and 45°.

Like the cutting end 30, the mounting end 20 is comprised of four edges of equal length between 1.9" and 2.1", and more preferably 2.0". The mounting end 20 also has a rounded square shape that results from each of the corners being beveled at an angle. More specifically, each corner formed between the surface of the mounting end 20 and each of the divergent sides 40, 50, 60 and 70 are chamfered at a 45° angle to produce a beveled edge surface between ⅟16" and ⅛" wide, and more preferably ³⁄32" wide.

FIGS. 2 and 3 also show the beveled edge surface comprised within the set of bevels 80 that are located at the corner between each of the divergent sides 40, 50, 60 and 70. Each beveled edge surface within this set is between 1.7" and 1.9" in length and lies at an angle between 30° and 60°, more preferably 45°, to each of two adjoining divergent sides. In addition, each beveled edge surface comprised in the set of bevels 80 includes at least one portion lying between the cutting end 30 and the mounting end 20, such as a portion that is roughly ⅛" wide.

The set of bevels 80 allows the shock from an impact delivered to a corner of a cutting edge to be transmitted and dispersed along a portion of the beveled edge surface. By dispersing the shock from such an impact away from the point where it occurs, the set of bevels 80 can reduce the likelihood of the impact chipping or fracturing the tooth 10, thus potentially extending its operational life.

The set of bevels 80, as well as the beveled edge surfaces along the mounting end 20, also serve to remove all sharp edges from all surfaces of the tooth 10, except for those located on the cutting end 30, and more specifically those edges in the first pair of opposed cutting edges 33, 35 and in the second pair of opposed cutting edges 37, 39. This can help an operator when handling the tooth 10 under conditions where it cannot be seen, such as when replacing a damaged tooth in the field.

The central mounting hole 90 may be created by drilling a hole perpendicularly through center of the tooth 10 from the mounting end 20 to the cutting end 30 (or vice versa). Preferably, a tap-drill is used to form the central void, which simultaneously taps this mounting hole to produce a thread. The thread in the central mounting hole 90 is used to attach the tooth 10 to a tooth holder that is described in more detail later.

FIGS. 6 to 10 show a tooth 100 constructed in accordance with a second embodiment of the invention.

In this embodiment, the length of each beveled edge surface comprising the set of bevels 80 includes two portions, namely: (i) a first portion 110 that extends from the cutting end 30 partway towards the mounting end 20 along each edge surface and (ii) a second portion 120 that extends from the end of the first portion 110 to the mounting end 20.

The first portion 110 of each of the beveled edge surfaces comprising the set of bevels 80 starts from the cutting end 30 and is between 0.6" and 0.7" in length, and more preferably is 0.655" long. The first portion 110 also tapers from an initial width of between 0.25" and 0.26" at its widest point (more preferably 0.258" wide at this point), to a width of between 0.10" and 0.12", and more preferably is 0.112" wide.

The second portion 120 of each of the beveled edge surfaces comprising the set of bevels 80 starts at the end of the first portion 110 (i.e., at a length of between 0.6" and 0.7" from the cutting end 30, and more preferably 0.655" from this end) and extends to the mounting end 20, which is a length of between 1.10 and 1.20", and more preferably 1.145" long. Unlike the first portion 110, the width of the second portion 120 maintains a constant width of preferably between 0.10" and 0.12", and preferably 0.112" wide, which is the same as the terminal width of the first portion 110 where it meets the second portion 120 at a junction line.

The distinctive tapered width of the first portion 110 is a result of a chamfer that is realized on each bevel 80 adjacent the cutting end (see second portion 110 (chamfer)). The chamfered portion of the bevel allow the shock from an impact delivered to a corner of a cutting edge to be transmitted and dispersed along the first portion 110. By dispersing impacts, this reduces the potential for chipping or fracture resulting from an impact that could require premature replacement of the tooth. The first portion 110 and the second portion 120 can have two different slopes. In particular, the slope of the first portion 110 can vary between 0° and 5°, while the slope of the second portion 120 can vary between 3° and 8°. As a result, there is a relative angle between the slopes of the first portion 110 and the second portion 120 that can vary between 3° and 8°.

Figure 7:
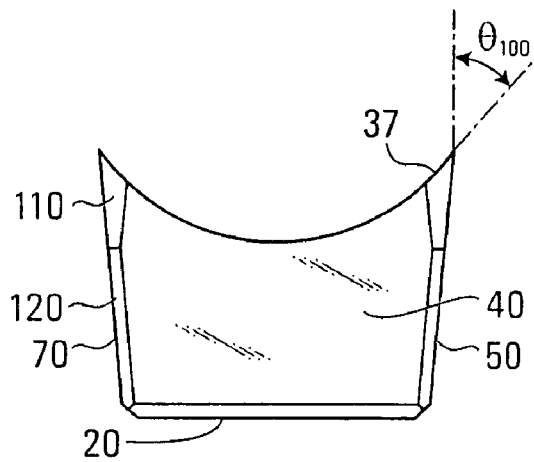
FIG. 7 is a top view of the tooth shown in FIG. 6, the bottom view thereof being identical.
Figure 8:
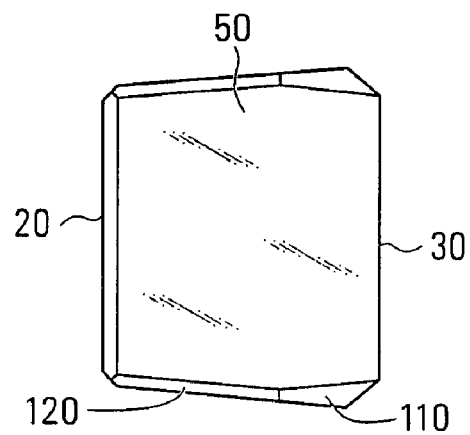
FIG. 8 is a side elevational view of the tooth show in FIG. 6, the right side view thereof being identical.
Figure 9:
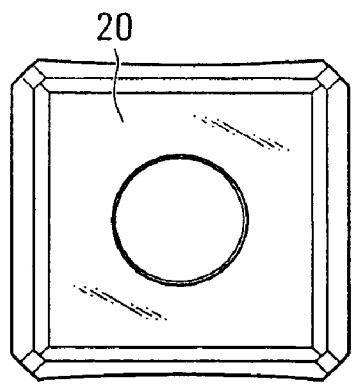
FIG. 9 is a rear view of the tooth shown in FIG. 6.
Figure 10:
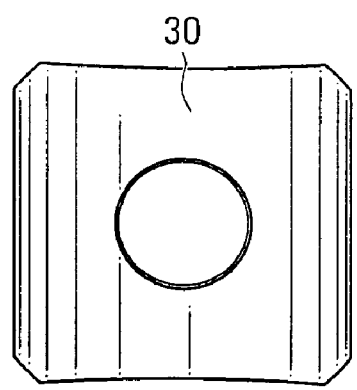
FIG. 10 is a front view of the tooth shown in FIG. 6.

As shown in FIG. 7, angle $\theta_{100}$ represents the angle between an imaginary line extending from one of the first pair of opposed cutting edges 37, 39 and an imaginary line extending from one of the opposed sides 50, 70. The angle $\theta_{100}$ represents the range of cutting angles of the concave cutting edge (edge 37, as shown in FIG. 7) and the value of the angle $\theta_{100}$ can vary between 25° and 50°, and more preferably between 35° and 45°.

FIGS. 11 to 16 show a tooth 200, 300, 400 constructed in accordance with a third, fourth and fifth embodiment of the invention. In these embodiments, an insert 210 of a different material, such as tungsten carbide steel, has been incorporated into the tooth 200, and more specifically, at an angle that orients it somewhat perpendicular to the cutting end 30. The insert 210 becomes part of the cutting surface of the first pair of opposed cutting edges 33, 35, as well as of the cutting surface of the second pair of opposed cutting edges 37, 39. As a result, the cutting surfaces is thus made of the material in the insert 210 (e.g., tungsten carbide steel) rather than of the material of the rest of the body of the tooth 200. This may provide certain advantages to the tooth 200 such as a longer operational life, a cutting edge that better retains its sharpness and/or better resistance to erosion or abrasion, as well as from fractures resulting from contact with materials to be cut.

The insert 210 may be inserted within, brazed or bonded with the body of the tooth 200 through means that are known in the art, such as through a copper-silver soldering method. In this way, any benefits conferred by properties of the material comprising the insert 210 are incorporated to the cutting edges in the cutting end 30, especially to those edges in the first pair of opposed cutting edges 33, 35. The benefits conferred by the insert 210 also benefit those cutting edges in the second pair of opposed cutting edges 37, 39 to a certain extent.

Figure 11:
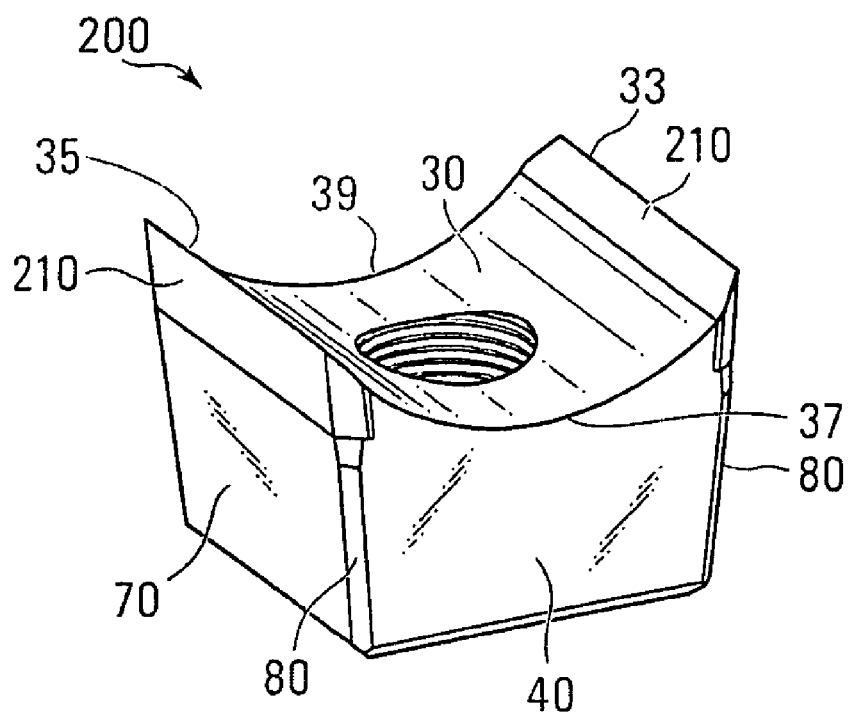
FIG. 11 is a perspective view of a tooth constructed in accordance with a third embodiment of the invention.
Figure 12:
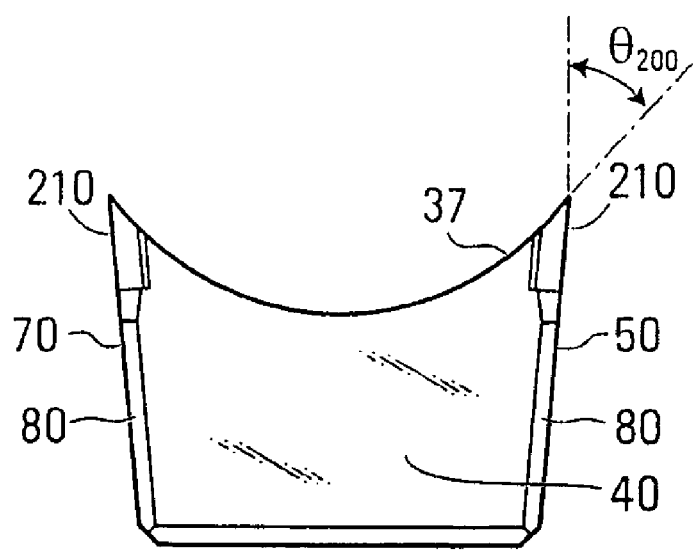
FIG. 12 is a top view of the tooth of FIG. 11.

As seen in FIGS. 11 and 12, the insert 210 is incorporated in the tooth 200 at an angle that orients it mostly parallel with the general orientation of the first pair of cutting edges 33, 35. As a result of this orientation, a significant portion of the divergent sides of the tooth 200, as well as the entirety of the first pair of opposed cutting edges 33, 35, benefit from the properties of the insert 210. However, only a small portion of the second pair of opposed cutting edges 37, 39, benefit from the properties of its material while the insert 210 is in this orientation.

It is also worth noting that in this embodiment, there are at least three portions included in the length of each beveled edge surface in the set of bevels 80 because of the chamfer applied to each cutting edge, namely: i) a first portion comprised of the material of the insert 210 (e.g. tungsten carbide steel) extending from the cutting end 30 partway towards the mounting end 20, ii) a second portion comprised of the material of the tooth 200 (e.g. fine grain alloy steel) extending from the end of the first portion to a point approximately equivalent with the lowest point of the meniscus formed by the second pair of opposed cutting edges 37, 39 and iii) a third portion comprised of the material of the tooth 200 extending from the end of the second portion to the mounting end 20. The orientation of the insert 210 may also change the cutting angle provided by the first pair of opposed cutting edges 33, 35.

As shown in FIG. 12, angle $\theta_{200}$ represents the angle between an imaginary line extending from one of the first pair of opposed cutting edges 37, 39 and an imaginary line extending from one of the opposed sides 50, 70. The angle $\theta_{200}$ represents the range of cutting angles of the concave cutting edge (edge 37, as shown in FIG. 12) and the value of the angle $\theta_{200}$ can vary between 25° and 50°, and more preferably between 35° and 45°.

Figure 13:
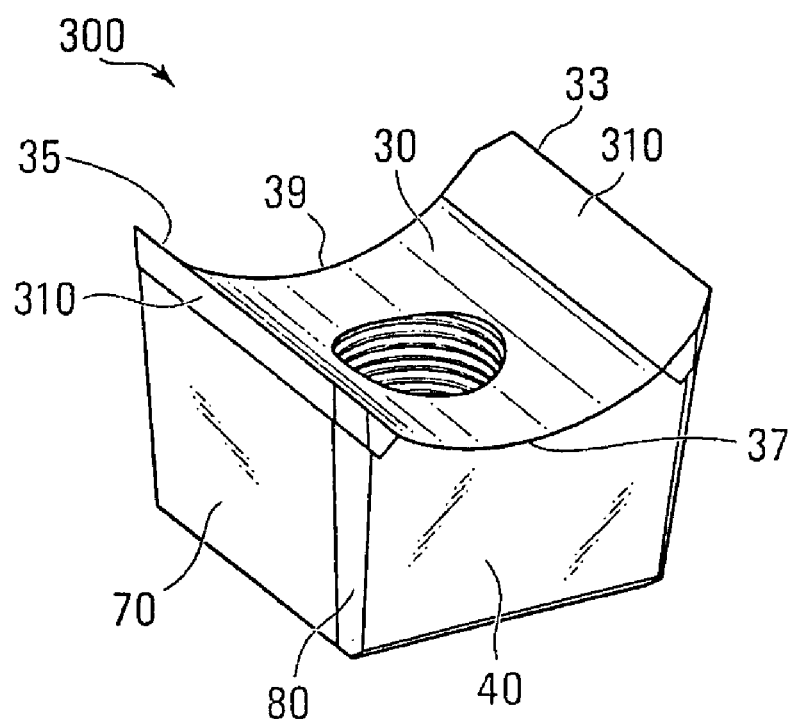
FIG. 13 is a perspective view of a tooth constructed in accordance with a fourth embodiment of the invention.
Figure 14:
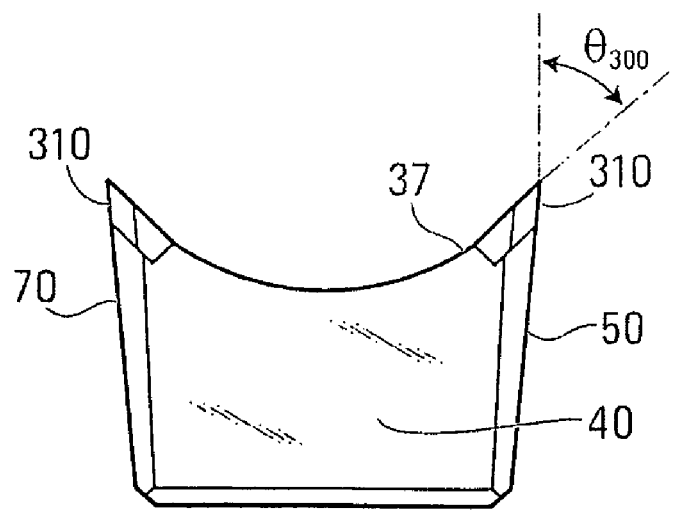
FIG. 14 is a top view of the tooth of FIG. 13.

FIGS. 13 and 14 show a tooth 300 constructed in accordance with a fourth embodiment of the invention where an insert 310 is incorporated in the tooth 300 at an angle that orients it mostly tangent with the general orientation of the second pair of opposed cutting edges 37, 39. In this orientation, the first pair of opposed cutting edges 33, 35 still benefits from the properties of the insert 310. In addition, a significant portion of the second pair of opposed cutting edges 37, 39 also benefit from the properties of the insert 310 while it is in this orientation. This orientation of the insert 310 may also change the cutting angle provided the first pair of opposed cutting edges 33, 35.

As shown in FIG. 14, angle $\theta_{300}$ represents the angle between an imaginary line extending from one of the first pair of opposed cutting edges 37, 39 and an imaginary line extending from one of the opposed sides 50, 70. The angle $\theta_{300}$ represents the range of cutting angles of the concave cutting edge (edge 37, as shown in FIG. 14) and the value of the angle $\theta_{300}$ can vary between 25° and 50°, and more preferably between 35° and 45°.

Figure 15:
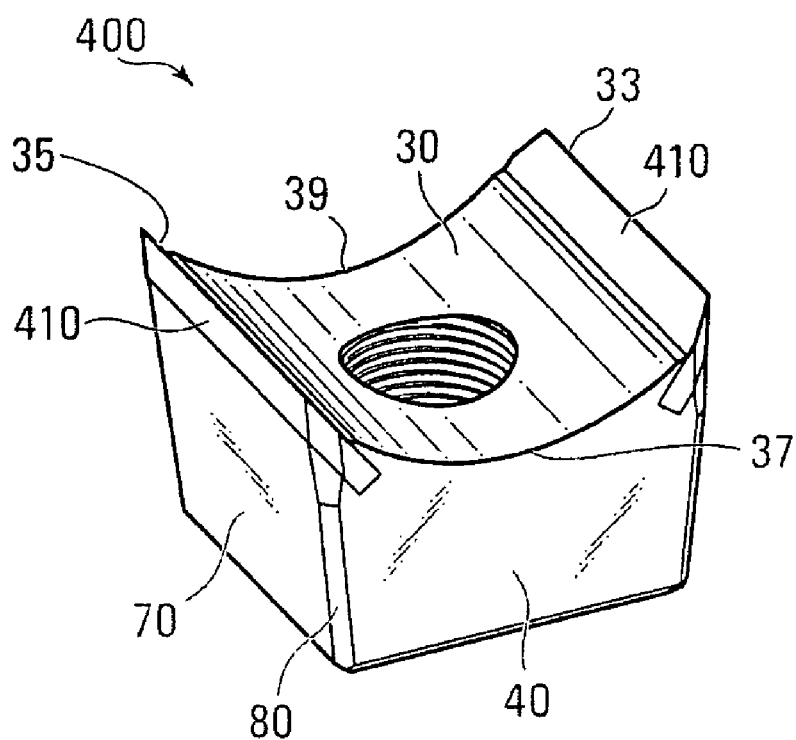
FIG. 15 is a perspective view of a tooth constructed in accordance with a fifth embodiment of the invention.
Figure 16:
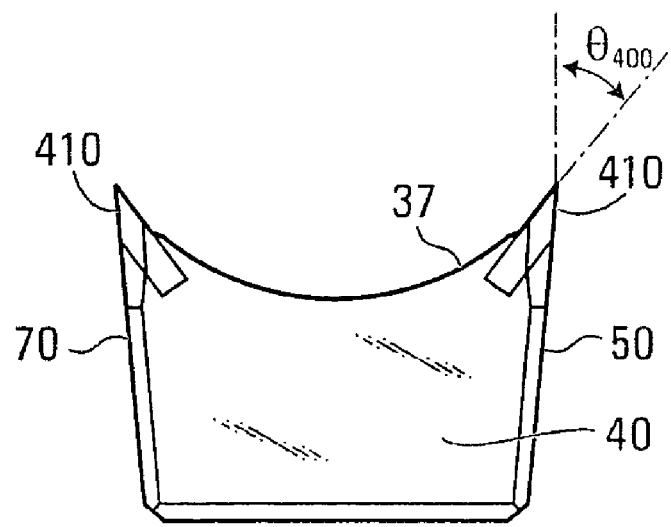
FIG. 16 is a top view of the tooth of FIG. 15.

FIGS. 15 and 16 show a tooth 400 constructed in accordance with a fifth embodiment of the invention where an insert 410 is incorporated to the tooth 400 at a angle that orients it partway between the general orientation of the first pair of opposed cutting edges 33, 35 and the general orientation of the second pair of opposed cutting edges 37, 39. As before, the entirety of the first pair of opposed cutting edges 33, 35 benefits from the properties of the insert 410. Additionally, a greater portion of the second pair of opposed cutting edges 37, 39 benefit from the insert 410 than was the case for the tooth 200, although this portion is somewhat less than the portion for the tooth 300. The orientation of the insert 410 changes the cutting angle provided by the first pair of opposed cutting edges 33, 35.

As shown in FIG. 16, angle $\theta_{400}$ represents the angle between an imaginary line extending from one of the first pair of opposed cutting edges 37, 39 and an imaginary line extending from one of the opposed sides 50, 70. The angle $\theta_{400}$ represents the range of cutting angles of the concave cutting edge (edge 37, as shown in FIG. 16) and the value of the angle $\theta_{400}$ can vary between 25° and 50°, and more preferably between 35° and 45°.

Figure 17:
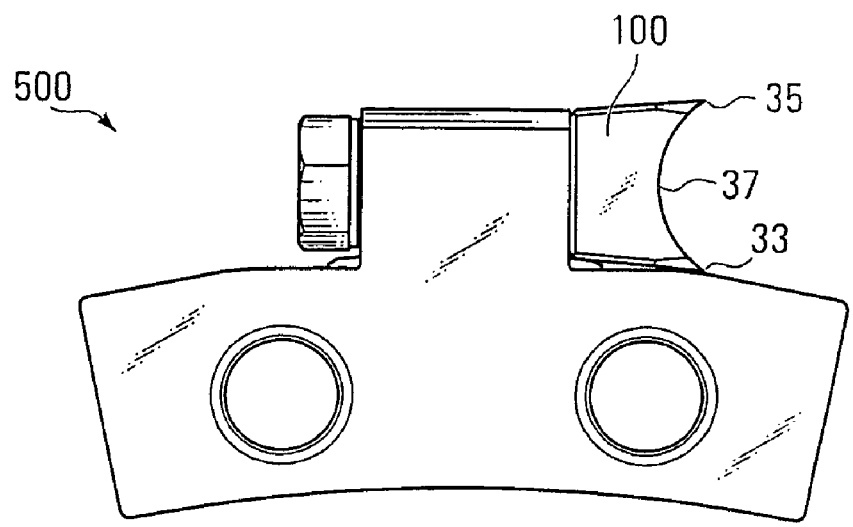
FIG. 17 is a side elevational view of the tooth of FIG. 6, the tooth being mounted on a holder in a first position.
Figure 17A:
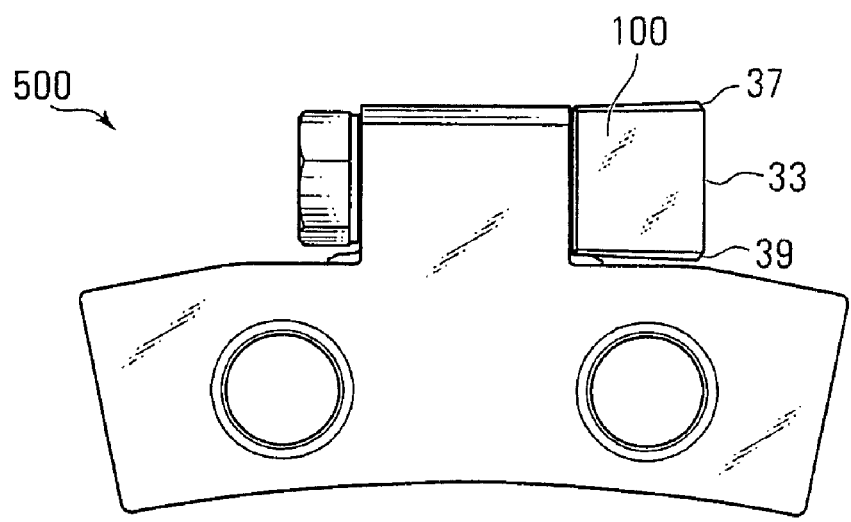
FIG. 17A is a side elevational view of the tooth of FIG. 6, the tooth being mounted on a holder in a second position.
Figure 19:
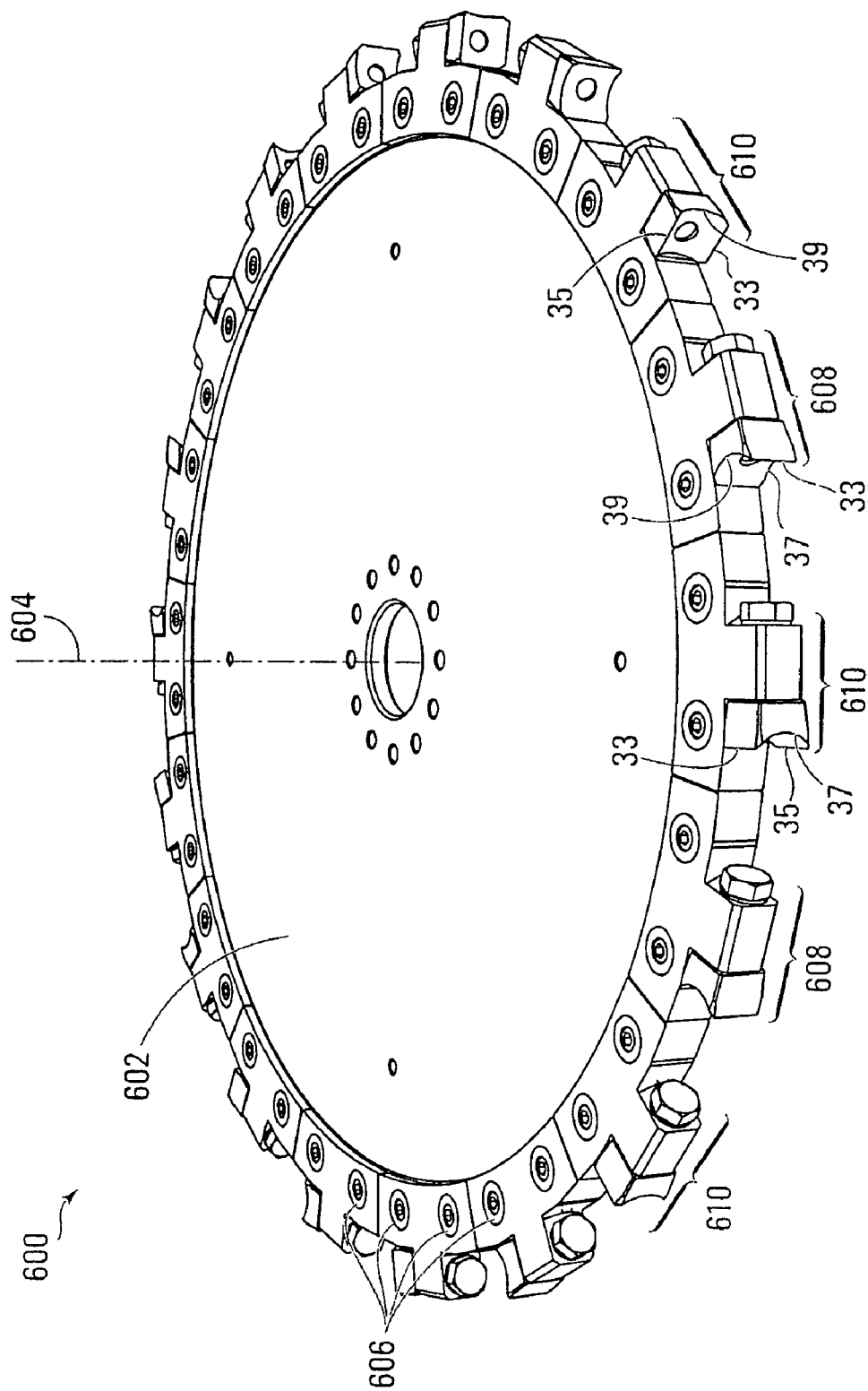
FIG. 19 is a perspective view of a saw with holders and teeth mounted thereon, a tooth in a first position alternating with a tooth in a second position.
Figure 20:
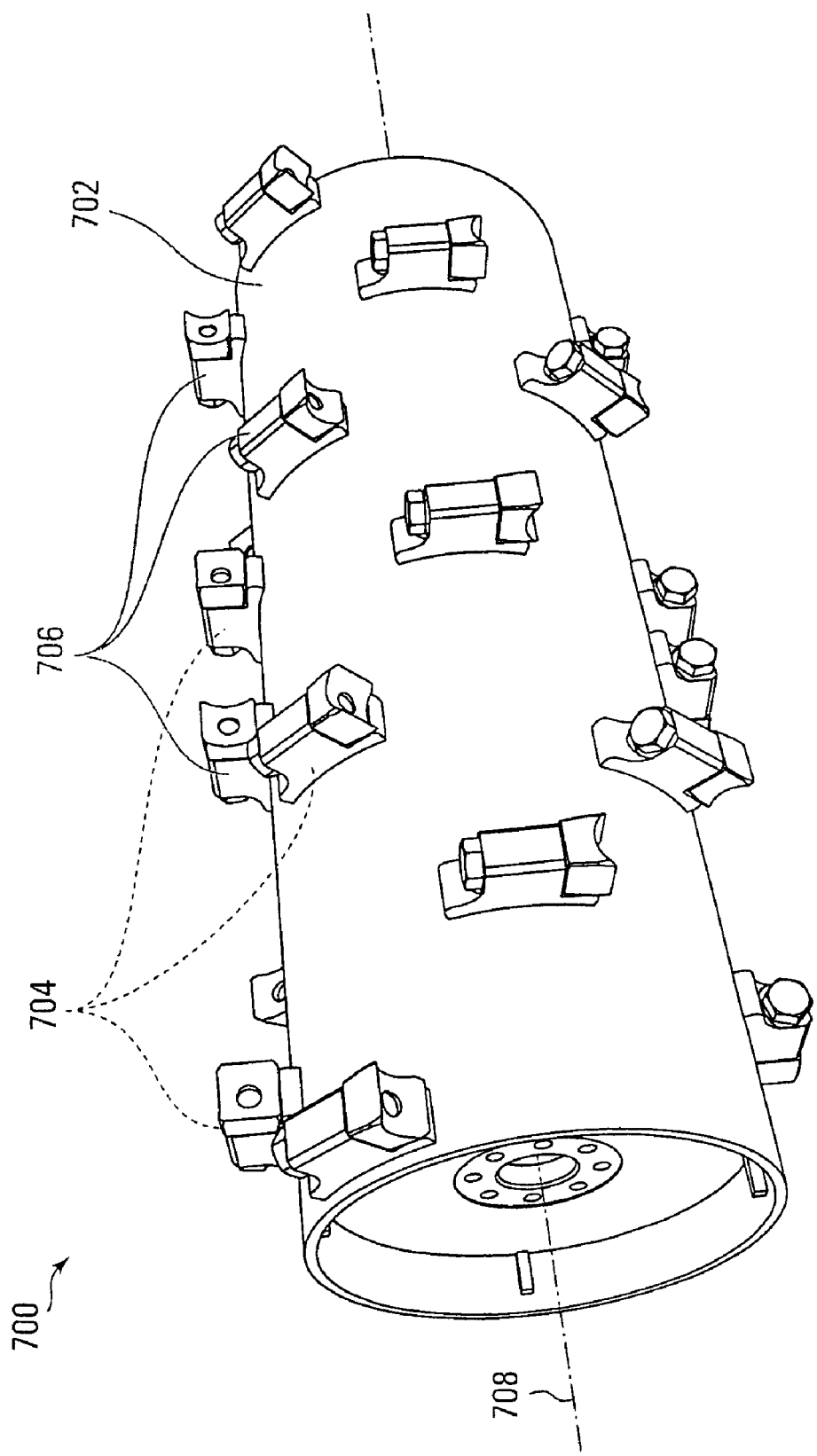
FIG. 20 is a perspective view of a mower drum of a brush mower with holders and teeth mounted thereon.
Figure 21:
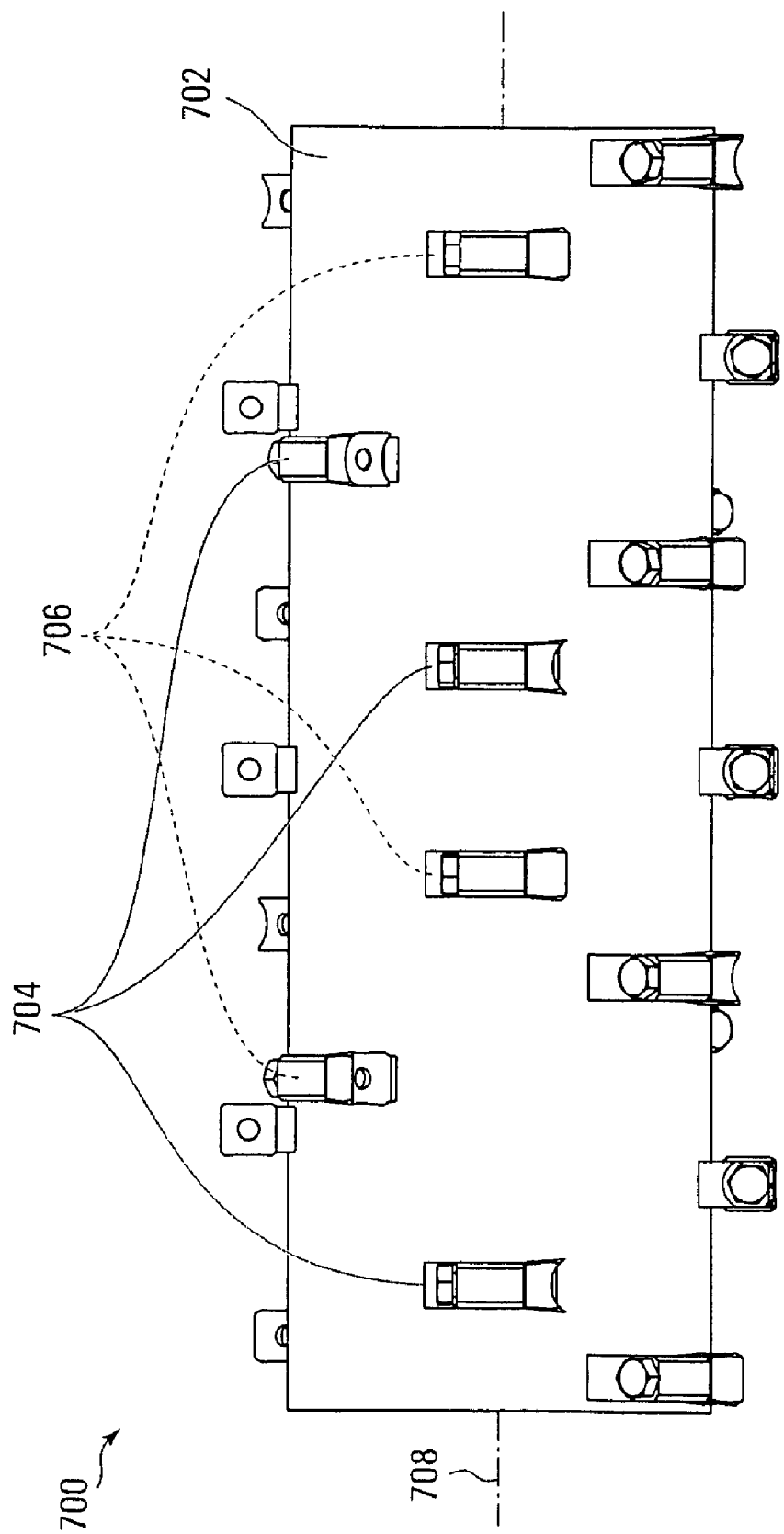
FIG. 21 is a front elevational view of the mower drum of a brush mower shown in FIG. 20.

FIGS. 17 and 17A show a tooth holder assembly 500 with the tooth 100 placed in two different cutting positions. The tooth 100 is adapted to be mounted on the tooth holder 300, which can itself be mounted on the peripheral edge of a circular saw disk, as shown in FIG. 19. A variant of the tooth holder 500 may also be adapted for mounting on the mower drum of a brush mower, as shown in FIGS. 20 and 21.

Although the tooth holder assembly 500 disclosed here is described with respect to the tooth 100 disclosed previously, it should be understood that the teeth 10, 200, 300 and 400 may also be used with the same results.

Figure 18:
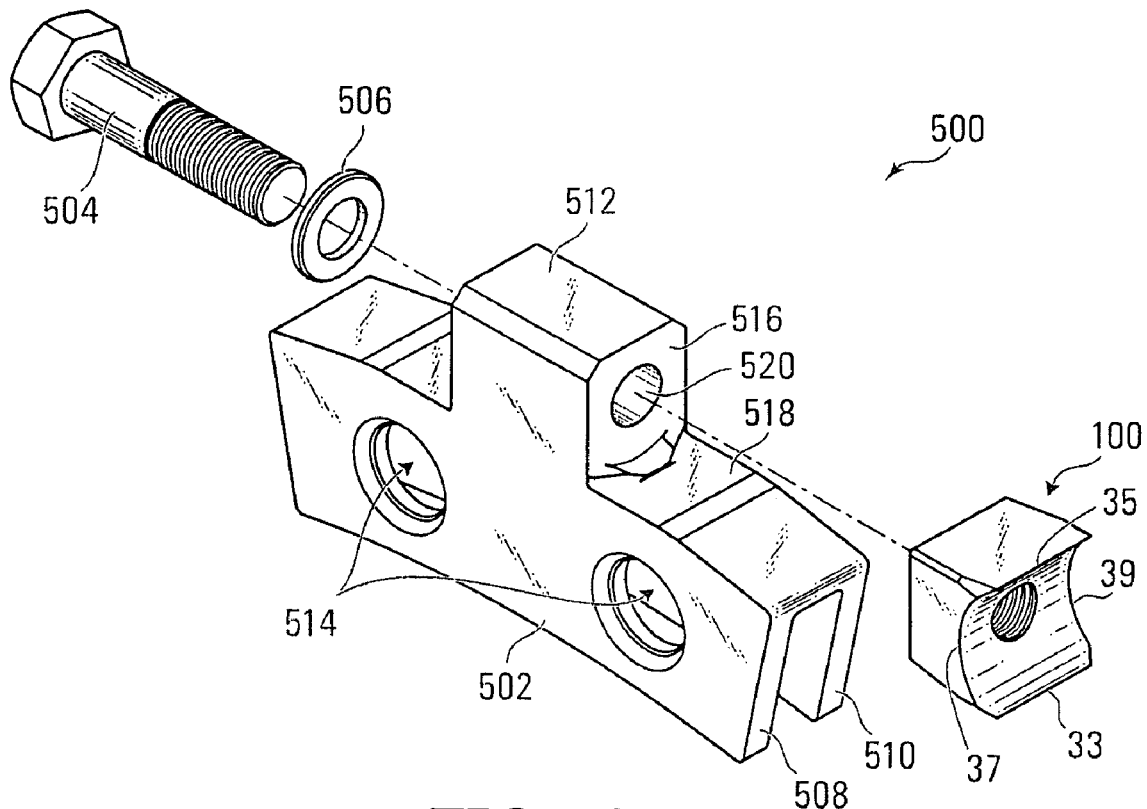
FIG. 18 is an exploded view of the tooth and holder construction shown in FIG. 17.
Figure 18A:
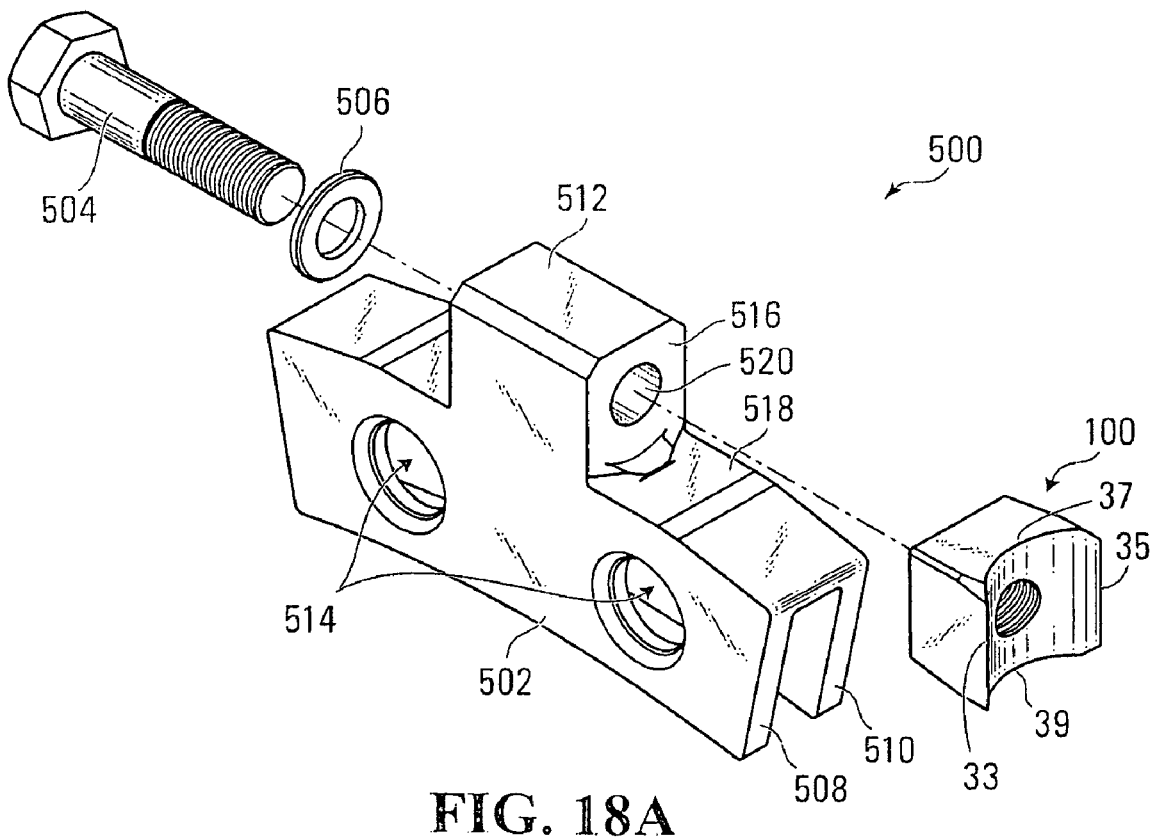
FIG. 18A is an exploded view of the tooth and holder construction shown in FIG. 17A.

As shown in FIGS. 18 and 18A, the tooth holder assembly 500 has a tooth holder body 502 and a fastening system, which in this case is comprised of a bolt 504 and a washer 506.

The body 502 has a set of legs 508, 510 and a tooth receiving portion 512. The set of legs 508, 510 are separated to permit the tooth holder assembly 500 to straddle the edge of a saw disk, such that the edge periphery of the body of the disk can be located between these legs. Moreover, the set of legs 508, 510 is shaped to follow the expected rotational direction of the saw disk or brush mower drum such that as the disk rotates in a particular direction, the tooth holder assembly 500 will follow in the same direction. The leg 508 also has two holes 514 that correspond to holes (not shown) in the leg 510. These holes allow the passage of bolts that secure the tooth holder assembly 500 to the exterior edge of a saw disk or outer surface of a brush mower drum.

The tooth receiving portion 512 has a tooth-mounting face 516 against which the mounting end 20 of the tooth 100 can rest, and a shoulder 518 which receives one of the four divergent sides 40, 50, 60, 70. The tooth receiving portion 512 also comprises an aperture 520 extending generally along the longitudinal axis of the tooth receiving portion 512. The rear side of the tooth receiving portion 512 allows entry and passage of the bolt 504 through the aperture 520 that allows the attachment of the tooth 100.

The divergent side that rests against the shoulder 518 determines in which of the two cutting positions the tooth 100 is placed. When one of the cutting edges of the first pair of opposed cutting edges 33, 35 (such as the edge 33 illustrated in FIG. 18) rests against the shoulder 518, the tooth 100 is in a first cutting position, which is shown in FIGS. 17 and 18. When the one of the cutting edges of the second pair of opposed cutting edges 37, 39 (such as the edge 39 illustrated in FIG. 18A) rests against the shoulder 518, the tooth 100 is in a second cutting position, which is shown in FIGS. 17A and 18A.

The difference between these two cutting positions is in the cutting edges that make contact with the material to be cut, such as a tree. In the first cutting position, the entirety of one of the cutting edges in the first pair of opposed cutting edges 33, 35 (namely, the edge 35 as illustrated in FIG. 18) makes substantial contact with the material to be cut and a portion of both of the cutting edges in the second pair of opposed cutting edges 37, 39 also make contact with the material. It is understood that while in this position, the edge 39 would not normally come into physical contact with the material to be cut.

The portion of the material (e.g., tree) that is removed through this contact varies according to the degree to which the operator forces contact between the tree and the saw. If the operator allows the saw to contact only the surface of the tree at its edge, a relatively small portion of the tree may be removed at an angle substantially parallel to that of the main cutting edge (i.e., the entirety of one of the cutting edges in the first pair of opposed cutting edges 33, 35). If the operator forces the saw to enter more deeply to the tree, however, a relatively larger portion of the tree is removed due to the influence of the additional cutting edges, namely the relevant portion of the cutting edges in the second pair of opposed cutting edges 37, 39. While the angle of the portion removed in this case may still be relatively parallel to that of the main cutting edge, it is likely to be less parallel with this edge than in the prior case.

Because the entirety of one of the cutting edges in the first pair of opposed cutting edges 33, 35 is used in both cases, (such as the edge 35 illustrated in FIG. 18) a relatively straight portion of the material may be planed or shaved from the contact between the straight cutting edge 33 or 35 and the surface of the tree, the portion size and angle being related to the degree of contact between the saw and the tree, as explained above. This action is similar to that of running a knife, wood plane or straight wood chisel against a straight wood board and is hereafter referred to as a "first cutting action".

In the second cutting position, contact with the material to be cut (such as a tree) is made with: (i) a significant portion (if not the entirety) of one of the second pair of opposed cutting edges 37, 39 (such as the cutting edge 37 illustrated in FIG. 18A), and (ii) a portion of both of the cutting edges in the first pair of opposed cutting edges 33, 35, namely the portion of these cutting edges that is proximate to the cutting edge of the second pair of opposed cutting edges 37, 39 that makes contact with the surface of the tree.

As before, the degree to which an operator forces contact between the saw and the material to be cut (such as a tree) determines the amount of material that is removed by the tooth 100. If the operator allows the saw to contact only the surface of the tree at its edge, a relatively small portion of the tree may be removed at an angle substantially parallel to that of the main cutting edges (i.e., the cutting edge in the second pair of opposed cutting edges 37, 39). If the operator forces the saw to enter more deeply to the tree, however, a relatively larger portion of the tree fiber may be cut and peeled away due to the influence of the additional cutting edges, namely the relevant portion of both of the cutting edges in the first pair of opposed cutting edges 33, 35. As before, the angle of the portion removed in this case may still be relatively parallel to that of the main cutting edge, but is less likely to be less parallel with this edge than in the prior case.

Because the main cutting edge is relatively concave, an irregularly shaped portion (or chunk) may be gouged from the contact between the material and one of the cutting edges 37, 39, as well as from a portion both of the cutting edges 33 and 35, the portion size and angle being related to the degree of contact between the saw and the tree, as explained above. This action is similar to that of taking a concave-shaped wood chisel and hammering it against a straight wood board and is hereafter referred to as a "second cutting action".

It should be noted that the cutting position of the tooth 100 does not change when it is rotated between the two cutting edges of the same pair. For example, assume that before use the tooth 100 is in the first cutting position with the cutting edge 33 resting against the shoulder 518 and that the opposite edge 35 being in a position to make substantial contact with the material to be cut. After a certain period of use, further assume that the tooth 100 is rotated 180° so that the cutting edge 35 is now resting against the shoulder 518 and the edge 33 is now in a position to make substantial contact with the material to be cut. Although the particular cutting edge that is resting against the shoulder 518 has changed, the overall cutting position of this tooth is unchanged and it remains in the first cutting position since both edges comprise the first pair of opposed cutting edges 33, 35.

FIG. 19 shows a saw 600 that may be used to cut trees in a method to be described below. The saw 600 has a plurality of teeth 100 arranged in an alternating fashion so that a sequence of cutting actions alternating between the first cutting action and the second cutting action can be delivered to the material to be cut, such as a tree.

The saw 600 comprises a disk 602, which is rotatable relative to an axis of rotation 604, and with a plurality of assembled tooth holders 500 with the teeth 100 being arranged along its exterior edge. To accommodate and allow attachment (and detachment) of these tooth holders, the edge of the disk 602 has a thickness allowing each instance of the tooth holder body 502 (and more particularly, the space between set of legs 508, 510) to straddle this edge, and is pierced with a set of holes corresponding to the holes in the set of legs 508, 510.

To attach (or detach) an instance of the tooth holder 500, an operator straddles the edge of the disk 602 between the set of legs 508, 510 and lines up the holes in these legs with those along this disk's edge. The operator then attaches the tooth holder 500 to the disk using a set of fasteners 606, such as bolts.

A non-limiting example showing the operation of the saw 600 with the teeth 100 is provided to show how the tooth 100 provides a new method for cutting a tree. In this method, a circular saw (such as the saw 600) that is configured with a plurality of tooth holders (such as the plurality of tooth holders 500) whose attached teeth are used to cut a tree by applying the first and second cutting actions described previously in an alternating fashion to the material to be cut, such as a tree trunk.

In this example, assume that the saw 600 is mounted to a felling head (not shown) and is kept generally parallel to the ground. As is assumed to be well known in the art, the felling head can be mounted to a tilling holder, which in turn can be attached to a manipulator arm of a tree cutting carrier. The felling head allows lateral, forward and backward movements of the saw 600.

Assume that the plurality of teeth 100 that are mounted on the saw 600 via the plurality of tooth holders 500 are arranged in both the first and second cutting positions. In particular, a first holder 608 indicates a member of the set of tooth holders where the tooth 100 is in its first cutting position, such that the first pair of opposed cutting edges 33, 35 (i.e., those that are generally straight) are generally parallel relative to the axis of rotation 604. Moreover, a second holder 610 indicates a member of the set of tooth holders where the tooth 100 is in its second cutting position, such that the first pair of opposed straight cutting edges 33, 35 of the other tooth are generally perpendicular relative to the axis of rotation 604.

FIG. 19 shows how the tooth holders 608 and 610 occupy alternating positions along the edge of the disk 602 in this configuration of the saw 600. For example, each instance of the first tooth holder 608 will be preceded (and followed) by an instance of the second tooth holder 610 and vice versa. Those skilled in the art will understand that other configurations of the saw 600 are possible, such as a saw with a different sequencing of teeth in the first and second positions or a saw that is comprised entirely of only teeth in one of the first or second cutting positions.

Because the plurality of teeth are arranged in alternating fashion, an instance of either the tooth in the first cutting position or of the tooth in the second cutting position will come into initial contact with the surface of the tree when the rotating saw 600 comes close enough.

When the tooth 100 is in its first cutting position (i.e., the straight cutting edges 33, 35 are generally parallel relative to the axis of rotation 604), one of the cutting edges from the first pair of opposed cutting edges 33, 35 that is generally straight comes into contact with the surface of the tree. In addition, depending on the degree of contact between the saw 600 and the tree that is permitted by the operator, a portion of the cutting edges in the second pair of cutting edges 37, 39 also come into contact with the surface of the tree. As a result, the tooth 100 performs the first cutting action, slicing a fairly straight slice of wood from the tree using the cutting edge 33 or 35.

When the tooth 100 is in its second cutting position (i.e., the straight cutting edges 33, 35 are generally perpendicular relative to the axis of rotation 604), the surface to be cut comes into contact with one of the cutting edges of the second pair of opposed cutting edges 37, 39 (which are generally concave), as well as a portion of the first pair of opposed cutting edges 33, 35 (which are generally straight).

As a result, the tooth 100 performs the second cutting action, gouging out a chunk of wood from the tree using the combined force of these cutting edges.

Because the teeth alternate between instances of the tooth in the first position and instances of the tooth in the second position, the cutting action performed by the tooth 100 in one instance of contact with the surface of the tree (e.g., the first cutting action that is performed by a first tooth 100 mounted in the first position) is followed by its alternate cutting action (e.g., the second cutting action performed by a second tooth 100 mounted in the second position). Therefore, as the saw 600 is moved in a lateral direction that is generally perpendicular to the orientation of the tree, a perpendicular slice of trunk (which is currently supporting the tree's weight) is subjected to repeated contact from the teeth 100 alternating between their first and second cutting positions and performing their respective first and second cutting actions. Such repeated contact can alternately shave and gouge the wood from the trunk that lies in front of the saw 600, eventually removing enough of this material that the trunk is no longer able to support the tree's weight and the tree falls.

It will be understood that as the saw 600 is used, the efficiency of the particular cutting edges of the first opposed pair of cutting edges 33, 35 and the second opposed pair of cutting edges 37, 39 of the tooth 100 that make contact with and perform repeated cutting actions against the tree trunk(s) likely decreases over time. Because the cutting edges are organized in opposed pairs, an operator can eventually rotate each instance of the tooth 100 such that the other cutting edge of the opposed pair becomes perpendicular to the axis of rotation 604 and thus becomes more likely to make contact with the material to be cut.

For example, assume that the cutting edge 33 of the first pair of opposed cutting edges 33, 35 and the cutting edge 37 of the second pair of opposed cutting edges 37, 39 are respectively initially positioned in the first holder 608 and the second holder 610 such that these edges are farther away from the axis of rotation 604 and therefore are more likely to come into physical contact with the trees to be cut. In contrast, the cutting edges 35 and 39 are initially mounted in the first holder 608 and the second holder 610 such that these edges abut and come into physical contact with the shoulder 518 of the tooth holder 500.

Over time, the cutting edges 33 and 37 become duller due to repeated contact and eventually the cutting actions of the teeth 100 lose their efficiency. Since this is likely to happen to all of the teeth in the saw 600 at about the same time, it may indicate that the cutting edges must be swapped.

To swap the cutting edge from a particular pair that performs the cutting action, the components of the fastening system that is used to attach the tooth to each tooth holder 500 mounted on the disk 602 are loosened, such as by unscrewing the bolt 50. Once these components are loosened sufficiently, the tooth may be rotated 180° and then the fastening system may be refastened to securely reattach the tooth in its new position. The result of this action is that the cutting edge in the opposed pair of cutting edges that had previously been in physical contact with the shoulder 518 is now farther from the axis of rotation 604 and is therefore more likely to contact the material to be cut. For example, this operation would result in the cutting edge 35 of the first pair of opposed cutting edges 33, 35 and the cutting edge 39 of the second pair of opposed cutting edges 37, 39 becoming positioned farther away from the axis of rotation 604. This new position makes them more likely to come into contact with a tree and therefore to perform their respective cutting action on its surface.

Since the cutting edges 35, 39 were less likely to come into contact with a tree previously due to their position, they are likely to be sharper than the cutting edges 33, 37 and therefore perform their respective cutting actions better than these edges. As a result, the overall efficiency of the saw may be improved through such an operation.

The overall cutting efficiency of the saw 600 may also be improved by rotating each instance of the tooth 90°, which reverses the pair of opposed cutting edges that potentially face contact with the surface of a tree from the first pair of opposed cutting edges 33, 35 to the second pair of opposed cutting edges 37, 39 (and vice versa). Performing such an operation effectively transforms each instance of the tooth 100 in the first position to an instance of the tooth 100 in the second position (and vice versa), while also maintaining the alternating nature of the plurality of the teeth.

For example, assume that an instance of the tooth is in its first cutting position and the first pair of opposed cutting edges 33, 35 are generally parallel relative to the axis of rotation. Over time, the effectiveness of one (or both) of these cutting edges decrease as they become dull from use and the efficiency of the tooth 100 to perform the first cutting action falls. Since this is likely to happen to all of the teeth in the saw 600 at about the same time, this results in a general decline in the overall cutting efficiency of the saw to cut trees using the method described above.

Each instance of the tooth that is currently in the first cutting position can thus eventually be rotated 90° so that each tooth may now be in the second cutting position and perform the second cutting action. In this new position, the second pair of opposed cutting edges 37, 39 are now used to perform the cutting action. Since these cutting edges had likely only been lightly used during the time while the tooth was in the first position, it is likely that the cutting edges 37, 39 are sharper and are therefore more likely to perform a more effective second cutting action than the first cutting action that may be performed by the dull cutting edges of the first pair of opposed cutting edges 33, 35. A similar operation can be performed for each instance of the tooth that is in the second cutting position to convert each tooth to the first cutting position.

When this operation is performed for each tooth, the overall efficiency of the saw can be improved so it can continue to effectively cut trees using the method described earlier. In addition, the tooth in this new configuration can still be rotated 180° through an operation similar to those disclosed above to reverse the particular cutting edge that performs the cutting action against the surface of the tree. This allows all four cutting edges of the tooth to be used to cut trees at different times, extending the operational lifespan of each tooth while also allowing the maintenance of the saw at a relatively higher overall cutting efficiency over time.

FIGS. 20 and 21 show a plurality of teeth 100 mounted on respective holders on a drum 700 of a brush mower, which may be used to cut and shred debris from tree cutting operations (e.g., stumps, fallen branches, leaves, etc.) and/or undergrowth (e.g., shrubs, tree roots, etc.) and transform them into mulch. The mower drum 700 has a drum surface 702, a plurality of assembled tooth holders that may be divided between a set corresponding to a first holder 704 and a set corresponding to a second holder 706, the mower drum 700 being rotatable relative to an axis of rotation 708.

The instances of the first holder 704 and the second holder 706 that are mounted on the drum surface 702 perform similar functions to the instances of the first holder 608 and the second holder 610 mounted on the disk 602 previously, namely: (i) they allow their respective instance of the tooth to be mounted in either its first or second cutting position; (ii) they allow their respective instance of the tooth to perform either the first or second cutting action when the tooth comes into contact with the surface of a material that may be cut or shred, such as tree branches, stumps or other undergrowth; and (iii) they allow the cutting edges of the tooth to be rotated between those of the first pair of opposed cutting edges 33, 35 and/or those of the second pair of opposed cutting edges 37, 39, as well as between these pairs of opposed cutting edges, whenever necessary through operations identical to those described previously.

As a result, when the mower drum 700 turns around its axis of rotation 708, each instance of the tooth in the first holder 704 and in the second holder 706 may come into contact with and perform a cutting action on material, such as wood or undergrowth. This is similar to the actions performed by the components of the saw in the method for cutting trees that was described above. However, the objective of the mower drum is different in that the cutting action of the tooth is intended to cut, rend and shred large debris that has already fallen to the ground into smaller pieces (or mulch) rather than cut standing trees.

In addition, although construction and operation of both the saw and the brush mower disclosed above have been described with respect to the tooth 100, it will be understood that the teeth 10, 200, 300 and 400 can also be used with the same results.

The above description of the embodiments should not be interpreted in a limiting manner since other variations, modifications and refinements are possible within the spirit and scope of the present invention. The scope of the invention is defined in the appended claims and their equivalents.

The invention claimed is:

1. A tooth for a circular saw or a mower drum that is rotatable relative to an axis of rotation, said tooth being mountable on a holder, which is mountable on the saw or the mower drum, said tooth having four corners and four divergent sides extending from a mounting end to a cutting end, said cutting end having a first pair of opposed cutting edges and a second pair of opposed cutting edges, said first pair of opposed cutting edges being generally straight and said second pair of opposed cutting edges being generally concave, wherein, in use, said tooth is mountable on the holder in four different positions, a first position and a third position, wherein said opposed straight cutting edges are generally parallel and said opposed concave edges are generally perpendicular relative to the axis of rotation of the saw or mower drum, and a second position and a fourth position, wherein said tooth is rotated of 90° and said opposed straight cutting edges are generally perpendicular and said opposed concave edges are generally parallel relative to the axis of rotation of the saw or mower drum.

2. A tooth as defined in claim 1, wherein said tooth has a body being in a frustro-pyramidal shape.

3. A tooth as defined in claim 2, wherein each divergent side has a first length at said cutting end and a second length at said mounting end, said first length being longer than said second end, and wherein difference between said second and first lengths results in a slope of between 3° and 8° between said mounting end and cutting end.

4. A tooth as defined in claim 3, wherein each corner defines a beveled surface extending from said mounting end to said cutting end.

5. A tooth as defined in claim 4, wherein each beveled surface is at an angle between 30° and 60°.

6. A tooth as defined in claim 5, wherein each beveled surface has a first portion extending from said cutting end to a junction line and a second portion extending from said junction line to said mounting end, said first portion having a first slope that varies between 0° and 5° and said second portion having a second slope that varies between 3° and 8°.

7. A tooth as defined in claim 4, wherein each of said opposed concave cutting edges has a cutting angle that varies between 25° and 50°.

8. A tooth as defined in claim 7, wherein said cutting angle varies between 35° and 45°.

9. A tooth as defined in claim 1, wherein said tooth is made of a first material and said opposed straight cutting edges are made of a second material, said second material being harder than said first material.

10. A tooth as defined in claim 9, wherein said second material is tungsten carbide steel.

11. A method of cutting a tree, comprising:
(a) providing a circular saw having a periphery and being rotatable relative to an axis of rotation;
(b) providing a plurality of holders mounted on the periphery of the saw;
(c) providing a plurality of teeth wherein each tooth has four corners and four divergent sides extending from a mounting end to a cutting end, the cutting end having a first pair of opposed cutting edges and a second pair of opposed cutting edges, the first pair of opposed cutting edges being generally straight and the second pair of opposed cutting edges being generally concave;
(d) mounting at least one of the teeth on a first holder in a first position or third position such that the opposed straight cutting edges are generally parallel and the opposed concave edges are generally perpendicular relative to the axis of rotation of the saw; and
(e) rotating at least another one of the teeth of 90° and mounting the at least another one of the teeth in a second position or fourth position on a second holder such that the opposed straight cutting edges are generally perpendicular and the opposed concave edges are generally parallel relative to the axis of rotation of the saw.

* * * * *

UNITED STATES PATENT AND TRADEMARK OFFICE
CERTIFICATE OF CORRECTION

| | | |
|---|---|---|
| PATENT NO. | : 8,061,396 B2 | Page 1 of 1 |
| APPLICATION NO. | : 12/355035 | |
| DATED | : November 22, 2011 | |
| INVENTOR(S) | : Charles MacLennan et al. | |

It is certified that error appears in the above-identified patent and that said Letters Patent is hereby corrected as shown below:

On the Cover Page:
Add Item -- (73) Assignee: Prenbec Equipment Inc. --

Signed and Sealed this

Thirteenth Day of March, 2012

David J. Kappos
*Director of the United States Patent and Trademark Office*